UNITED STATES PATENT OFFICE.

FRANCIS C. PHILLIPS, OF ALLEGHENY CITY, PENNSYLVANIA.

PROCESS OF OBTAINING IODINE FROM BITTERN.

SPECIFICATION forming part of Letters Patent No. 356,291, dated January 18, 1887.

Application filed January 14, 1886. Serial No. 183,544. (No specimens.)

*To all whom it may concern:*

Be it known that I, FRANCIS C. PHILLIPS, of Allegheny City, in the county of Allegheny and State of Pennsylvania, have invented a new and useful Improvement in Obtaining Iodine from Bittern; and I do hereby declare the following to be a full, clear, and exact description thereof.

My invention relates to the treatment of the bittern obtained from the salt-crystallizing vats in the manufacture of the salt of commerce from salt-water, this brine or bittern being gradually concentrated by the evaporation of water therefrom and the salt being gradually crystallized in the vats as the water is gradually driven off therefrom. It has been known for some time that this bittern contained a large proportion of bromine, and the bromine has heretofore been obtained from the bittern by treating it in a sandstone still in the presence of sulphuric acid and chlorate of potash or binoxide of manganese, the bittern with these substances being heated and the bromine set free and distilled over in vapor, which is condensed by suitable means. By this process only the bromine is obtained; but a small proportion of iodine is contained in the bittern, and in this treatment the iodine is entirely lost.

My invention relates to the recovery of the iodine from the bittern, its purpose being, first, to recover the iodine therefrom and subsequently obtain the bromine in the ordinary manner; and it consists, generally, in treating the bittern in such manner as to liberate the iodine from the compound in which it occurs in the bittern, recovering the iodine so freed and in solution in the bittern, and subsequently recovering the bromine from the bittern by distilling the same over, as above described.

It also consists in the steps necessary in treating the bittern, first, to free the iodine from the chemical combination occurring therein, to extract the iodine thus freed from its chemical combination, but held in mechanical solution, by agitation of the bittern with a certain oil, by means of which it is absorbed from the bittern; second, to obtain the iodine from this oil, by chemical treatment and heat under pressure, and, lastly, to obtain the iodine in pure form after extracting it from the oil.

In carrying out my invention, the iodine is set free from the bittern by nitrous acid, or by the action of sulphuric acid and chlorate of potash, or other suitable oxidizing agent, and the iodine is then held mechanically dissolved in the bittern, but free from chemical combination. After the bittern is thus treated, it is then agitated with a suitable oil, the oil preferred by me being what is known as the "dead-oil," distilled from coal-tar, also termed "heavy oil," though the coal-tar or pitch before this distillation and other distillates thereof, as well as heavy petroleum-oils, can also be employed for the purpose, this oil having the property of taking up and holding a large proportion of the iodine which is mechanically dissolved in the bittern, and thus removing it therefrom. The oil which has thus been charged with the iodine is then removed from the bittern and placed in an air-tight vessel and heated strongly in contact with an alkaline substance, and by this means the iodine is taken up from the oil by the alkali forming a metallic iodide in solution. This metallic iodide is then placed in a suitable still and the pure iodine recovered therefrom by heating the iodide with sulphuric acid and binoxide of manganese or chlorate of potash, or other substance capable of setting free the iodine. The dead-oil or equivalent material by means of which the iodine has been extracted from the bittern is again utilized for absorbing the iodine from a fresh portion of bittern, and the bittern from which the iodine has thus been extracted is substantially utilized for the manufacture of bromine, in the manner above described.

To enable others skilled in the art to practice my invention, I will now proceed to describe the same more fully and in detail.

In the ordinary process of salt-manufacture the salt-water is evaporated until the greater part of the salt originally held in solution has crystallized out. The heavy mother-liquor, commonly called "bittern," sufficiently concentrated, contains bromine and small quantities of iodine. The bittern, sufficiently concentrated, is first tested chemically to ascertain the proportion of iodine it contains, this iodine being chiefly in combination as an iodide, although there is probably also some iodate. After ascertaining the proportion of iodine contained in the bittern, the following additions are made to it. If it is found that iodates are present, a calculated quantity of reducing substance is added to convert such iodates to iodides. As a reducing substance sulphite of soda or green vitriol may be used. Then a calculated quantity of strong acid—such as muriatic acid or sulphuric acid—is added to cause the reducing substance to act upon the iodate. After this treatment the iodine is present as an iodide, or perhaps as hydriodic acid. A calculated quantity of nitrous acid or fuming nitric acid is now added; or, if preferred, potassium nitrite and sulphuric acid, or chlorate of potash and sulphuric acid, or other suitable oxidizing agent which will set free the iodine from its combination, may be employed. The quantities of the above-named substances which are added are to be calculated from the known chemical reactions which occur when these additions are made. If it is found that no iodates are present in the bittern, then the usual reducing substances above named (green vitriol, sulphite of soda, &c.) are omitted. The bittern is now found to have assumed a yellow color, and contains the iodine in a free or uncombined state, but mechanically dissolved in the bittern. A quantity of oil or other suitable material for absorbing the iodine from the bittern is then added, and the bittern and oil are constantly agitated, and from time to time the bittern is tested for iodine until it is found to have been practically deprived of its iodine, and this step of the process is then completed.

The oil or other absorbing agent should be carefully chosen, and I have found the substance best suited for the purpose to be what is commonly known as the "dead-oil" obtained in the distillation of coal-tar, sometimes termed "heavy oil," though the coal-tar or pitch before distillation and the different oils or products obtained on the distillation of coal-tar are well suited for the purpose. Crude petroleum and the heavier products obtained in the treatment of petroleum are also found to have some qualities of absorbing the iodine from the bittern; but they do not give as good results as the dead-oil or the other products of the distillation of coal-tar, and refined petroleum and the light distillates have practically no properties as such absorbent.

Where the dead-oil cannot be obtained, I have found that the light "oil" obtained in the distillation of coal-tar can be used for the purpose, though none of these substances can absorb so large a portion of the iodine as the dead-oil, this dead-oil absorbing from ten to twenty per cent. of the iodine, according to its composition, which varies within certain limits.

When the dead-oil is used, it is preferable to purify it from sulphureted hydrogen and other sulphur compounds by agitating it with a small portion of green vitriol and lime and heating it gently. The quantity of such oil to be used will depend upon the quantity of iodine present in the bittern, ten pounds of dead-oil to one pound of iodine being ample for the purpose. The oil is added slowly a little at a time, and the bittern and oil are well agitated. If the bittern is warm, or even hot, the absorption of the iodine by the oil will be more rapid.

After it is shown by suitable tests, as above referred to, that all the iodine has been absorbed from the bittern, the oil is permitted to separate from the bittern on which it usually floats, and this step of the process is completed. The oil containing the iodine is then removed from the bittern in any suitable manner, and is placed in an air-tight vessel capable of withstanding a pressure of about six atmospheres, and termed by me a "digester," and the quantity of caustic soda, caustic potash, carbonate of soda, carbonate of potash, or slaked lime is added thereto, caustic soda being preferred by me, a quantity of water being also added, and the vessel is then closed and is heated by steam passing through a coil of pipe therein, a small proportion of live steam being preferably introduced, as it facilitates the reaction. I find that the proportions for this treatment are about two pounds of soda for every pound of iodine contained in the oil and about four pounds of water to one pound of iodine. When lime is employed, the proportion should be about five pounds of lime to one pound iodine contained in the oil. The contents of vessel are then heated by steam until the temperature is raised to that of steam of from four to six atmospheres pressure and the heat continued for several hours, the contents being at the same time agitated by any suitable stirring apparatus, and in this treatment the iodine is extracted from the oil by means of the alkali employed, and exists in combination with this alkali. The heating having been continued a sufficient length of time, the vessel is allowed to cool and the contents are removed therefrom. The oil from which the iodine has thus been extracted is then separated from the alkaline solution containing the iodine, and it is found that the oil is freed or nearly freed from its iodine, and it is then ready to be used in the treatment of a fresh portion of the bittern. The alkaline solution containing the iodine as a metallic iodide is then placed in a suitable distilling apparatus and acidulated with sulphuric acid, and after the addition of binoxide of manganese or chlorate of potash, or other oxidizing agent, the iodine is distilled over a gentle heat, which is best accomplished by the use of a current of steam, the still being heated over a fire and a current of steam passed through the boiling-hot liquid contents of the still, the iodine being subsequently condensed, and thus obtained in a pure state.

The bittern from which the iodine has been removed by the above process can, subsequent to the removal of the iodine, be run into the ordinary bromine-still, and the bromine then recovered by the ordinary process as carried on at salt-works at the present time.

By my invention I am thus enabled to obtain from this salt-water bittern the iodine contained therein, thus utilizing the iodine, which has heretofore been entirely wasted.

By my improved process of treatment I am also enabled to obtain the iodine in pure state by a simple and comparatively inexpensive process, which can be carried on continuously, and which does not require expensive apparatus, the most costly part of the apparatus being the digester in which the oil containing the iodine is treated with the alkali to extract the iodine therefrom.

The construction of apparatus suitable for practicing my invention can be varied according to the quantity to be treated, and many different forms of apparatus can be employed, and for this reason I have not illustrated the apparatus.

What I claim as my invention, and desire to secure by Letters Patent, is—

1. The herein-described process of treating salt-water bittern, consisting in setting the iodine free from the chemical combination in which it occurs in the bittern, absorbing the free iodine from the bittern, and subsequently extracting the bromine from the bittern, substantially as and for the purposes set forth.

2. The herein-described process of treating salt-water bittern, consisting in first setting the iodine free from the chemical combination in which it occurs in the bittern, and then absorbing the iodine with dead-oil or equivalent oily or tarry substance, substantially as and for the purposes set forth.

3. The herein-described process of treating salt-water bittern, consisting in first setting the iodine free from the chemical combination in which it occurs in the bittern; second, absorbing the iodine with dead-oil or equivalent oily or tarry substance, and, third, distilling the bittern to extract the bromine therefrom, substantially as and for the purposes set forth.

4. As a step in the process of obtaining iodine from salt-water bittern, absorbing the iodine therefrom in an oily or tarry substance and heating the oily or tarry substance in the presence of alkali, substantially as and for the purposes set forth.

5. As a step in the process of obtaining iodine from salt-water bittern, absorbing the iodine therefrom in an oily or tarry substance and heating the substance containing the iodine under pressure and in the presence of alkali, substantially as and for the purposes set forth.

6. As steps in the process of obtaining iodine, extracting the iodine absorbed in an oily or tarry substance by means of an alkali and freeing and distilling the iodine from the alkali, substantially as and for the purposes set forth.

7. The herein-described process of obtaining iodine from salt-water bittern, consisting in first freeing the iodine from the chemical combination in which it occurs in the bittern, absorbing the iodine therefrom in an oily or tarry substance, extracting the iodine from the oily or tarry substances by an alkali, and freeing and distilling the iodine from the alkali, substantially as and for the purposes set forth.

In testimony whereof I, the said FRANCIS C. PHILLIPS, have hereunto set my hand.

FRANCIS C. PHILLIPS.

Witnesses:
JAMES I. KAY,
J. N. COOKE.